United States Patent
Ishida et al.

(10) Patent No.: US 6,737,761 B2
(45) Date of Patent: May 18, 2004

(54) POWER LOAD CONTROL SYSTEM

(75) Inventors: Takeo Ishida, Hirakata (JP); Hirosato Yagi, Ikoma (JP); Ryuzo Hagihara, Kadoma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/967,966

(22) Filed: Oct. 2, 2001

(65) Prior Publication Data

US 2002/0038980 A1 Apr. 4, 2002

(30) Foreign Application Priority Data

Oct. 4, 2000 (JP) .......................... 2000/305272

(51) Int. Cl.[7] .............................. H02J 1/00; H02J 3/00
(52) U.S. Cl. ........................................... 307/41; 307/31
(58) Field of Search ................... 307/31, 38, 41

(56) References Cited

U.S. PATENT DOCUMENTS

| | | | | |
|---|---|---|---|---|
| 4,064,485 A | * | 12/1977 | Leyde | 307/39 |
| 4,100,428 A | * | 7/1978 | Delisle et al. | 307/97 |
| 4,136,392 A | * | 1/1979 | Westphal et al. | 700/296 |
| 4,247,786 A | * | 1/1981 | Hedges | 307/35 |
| 4,264,960 A | * | 4/1981 | Gurr | 700/295 |
| 4,277,691 A | * | 7/1981 | Lunn | 307/35 |
| 4,349,879 A | * | 9/1982 | Peddie et al. | 700/295 |
| 4,471,232 A | * | 9/1984 | Peddie et al. | 307/35 |
| 4,612,619 A | * | 9/1986 | Culp | 307/31 |
| 4,916,328 A | * | 4/1990 | Culp, III | 307/39 |
| 5,426,620 A | * | 6/1995 | Budney | 368/10 |
| 5,572,438 A | * | 11/1996 | Ehlers et al. | 307/37 |
| 5,576,700 A | * | 11/1996 | Davis et al. | 340/3.31 |
| 5,687,139 A | * | 11/1997 | Budney | 368/10 |
| 5,892,758 A | * | 4/1999 | Argyroudis | 340/870.02 |
| 6,026,651 A | * | 2/2000 | Sandelman | 62/155 |
| 6,167,389 A | * | 12/2000 | Davis et al. | 700/11 |

* cited by examiner

Primary Examiner—Gregory J. Toatley, Jr.
(74) Attorney, Agent, or Firm—Armstrong, Kratz, Quintos, Hanson & Brooks, LLP

(57) ABSTRACT

A system for reducing power without making users feel inconvenience and discomfort in collective housing or the like. The system includes a plurality of air conditioners and a central control unit connected with the air conditioners via a communication line. The central control unit controls the plurality of air conditioners to operate in time or alternately to prevent electric current concentration.

10 Claims, 3 Drawing Sheets

| minute\group | 2 | 4 | 6 | 8 | 10 | 12 | ... |
|---|---|---|---|---|---|---|---|
| 1 | ○ | ○ | × | ○ | ○ | × | ... |
| 2 | × | ○ | ○ | × | ○ | ○ | ... |
| 3 | ○ | × | ○ | ○ | × | ○ | ... |

| minute\group | 2 | 4 | 6 | 8 | 10 | 12 | 14 | 16 | 18 | | |
|---|---|---|---|---|---|---|---|---|---|---|---|
| 1 | ○ | △ | × | △ | ○ | △ | × | △ | ○ | △ | × |
| 2 | △ | × | △ | ○ | △ | × | △ | ○ | △ | | |
| 3 | × | △ | ○ | △ | × | △ | ○ | △ | × | | |
| 4 | △ | ○ | △ | × | △ | ○ | △ | × | △ | | |

POWER LOAD CONTROL SYSTEM

BACKGROUND OF THE INVENTION

1. Field of the Invention

The present invention relates to a power load control system suitable for collective housing such as apartments.

2. Description of the Related Art

A distribution system, in which power is received collectively at a high voltage, for example, at 6000 V and is distributed to individual households at low voltage (100V or 200V), is employed in collective housing such as apartments. The following differences are considered between a system in which power is received at a low voltage by each household and a system which power is received collectively at a high voltage and is distributed at low voltage to each household.

FIG. 1 is a schematic view illustrating one example that power is supplied to a house, wherein power is distributed in a house 201 through a breaker at low voltage (100 V or 200 V) from a power system 200 of a distribution company. The contract capacity is determined on the basis of a maximum power capacity. The maximum power capacity is determined by assuming a case that appliances which consume large amount of power such as a TV, an air conditioner, a rice cooker, a washing machine, and a refrigerator are used at the same time. For example, the contract capacity when these appliances are used at the same time is generally determined to be 3 kVA. Available power capacity (VA) is determined in a contract with the distribution company.

Usually, the contact is made on the basis of the power capacity (VA) when the load in the house is used at maximum, and a breaker suitable for that power capacity is equipped by the power distribution company.

FIG. 2 is a schematic view illustrating one example of a system for collectively receiving at a high voltage and distributing at a low voltage which is used for distributing from a power distribution company to collective housing such as apartments. Power is collectively received at a receiving equipment 300 equipped with collective housing at a high voltage such as 6000 V from the power distribution company and the power is distributed from the receiving equipment 300 to each household 13a, 13b ... 13n at a low voltage (100 V or 200 V). The power is converted to a low voltage by the receiving equipment 300, and is supplied to the households 13a, 13b ... 13n through a breaker 130 equipped with each of the households 13a, 13b ... 13n. A load 131 in each of the households 13a, 13b... 13n is driven by the supplied power.

FIG. 3 is a diagram for comparing power amounts used in a month and electricity bills in a collective high voltage receiving and low voltage receiving. As shown in FIG. 3, a base rate of the low voltage receiving is small as compared with of the collective high voltage receiving and little depends on the contract capacity. On the other hand, the bill in the high voltage receiving becomes smaller as the contract capacity becomes small.

In the cases (1) and (2) of FIG. 3, the base rate is about 2000 yen and 1300 yen respectively.

An electricity bill in total is a sum of the base rate and usage-based charge in both of the cases. In the low voltage receiving, usage-based charge per kWh is large. In addition, in the bill system of the low voltage receiving, the usage-based charge per kWh increases when used amount exceeds a certain level.

On the other hand, in the high voltage collective receiving, the charge per kWh is smaller than that in the low voltage receiving, and even when the usage amount increases, the charge per kWh does not change. It is noted that the charge per kWh changes depending on seasons, and the charge per kWh changes depending on time in three levels when a time-varying charge contract is made. As shown in FIG. 3, electricity bills in the high voltage collective receiving (the case (1)) and the low voltage receiving are balanced at the A point.

In the high voltage collective receiving, the electricity bill is smaller when the contract capacity is small.

In collective housing, however, a receiving equipment for an excessive contract capacity is employed in assuming such a case that high load electrical appliances such as air conditioners are being operated at the same time.

SUMMARY OF THE INVENTION

The present invention was made to solve the above problem and provide a system for reducing receiving power capacity without user inconvenience and discomfort in collective housing or the like.

A power load control system according to the present invention comprises a plurality of high load electrical appliances and a power control unit connected with the plurality of high load electrical appliances. The power control unit controls operation of the plurality of high load electrical appliances together.

The power control unit controls the plurality of high load electrical appliances to operate in time or alternately.

As a result, concentration of operation of the high load electrical appliances can be prevented and a peak electric current can be greatly reduced.

The plurality of high load electrical appliances are divided into n groups, and the power control unit controls to prohibit the high load electrical appliances in one to n−1 of the n groups from starting operation for a certain time and to allow the high load electrical appliances in the rest of the groups to start and continue operation, and repeats to control periodically so as to ensure that one to n−1 of the n groups are prohibited from starting operation.

The high load electrical appliances which, once started to operate, can continue to operate even when they are in a group which is prohibited from starting operation. A high load electrical appliance generally requires a large current at starting. Thus, when the appliances are controlled at starting, a peak electric current can be greatly reduced. When taking an air conditioner as an example, an air conditioner which once started operation can continue to operate even when it is in a group which is prohibited from the starting operation. A peak electric current can be greatly reduced when an air conditioner is controlled at starting because an air conditioner requires a large current at starting. Operation after starting does not matter in order to reduce a peak current. Furthermore, when an air conditioner which once started operation stops, an user may feel uncomfortable. Therefore, it is better that an air conditioner which started operation continues to operate.

The plurality of high load electrical appliances are divided into n groups, and the power control unit controls the electrical appliances in one to n−1 of the n groups to output 100% and the electrical appliances in the rest of the groups to output less than 100%, and changes an output percentage cycle periodically. As a result, every high load electrical appliance can be operated while total power consumption is suppressed without making users feel uncomfortable.

A power load control system according to the present invention comprises a system for collectively receiving at a high voltage by receiving equipment equipped in collective housing and distributing at a low voltage from the receiving equipment to each of households in the collective housing, high load electrical appliances equipped in the households, and a power control unit connected with each of the high load electrical appliances. The power control unit controls operation of the high load electrical appliances together.

The collective housing refers to an apartment, a dormitory, or a group of a plurality of detached houses.

The power control unit controls the high load electrical appliances to operate in time or alternately.

The households in the collective housing are divided into (n) groups, the power control unit controls to prohibit the high load electrical appliances in one to n−1 of the n groups from starting operation for a certain time and allow the high load electrical appliances in the rest of the groups to start and continues operation, and repeats to control periodically so as to ensure that one to n−1 of the n groups are prohibited from starting operation.

The households in the collective housing are divided into n groups, the power control unit controls the high load electrical appliances in one to n−1 of the n groups to output 100% and the electrical appliances in the rest of the groups to output less than 100%, and changes an output percentage cycle periodically.

The high load electrical appliances are linked with the power control unit via a wired or wireless communication line.

With the above constitution, power used at a peak can be suppressed. Thus, in the collective housing or the like, a total contract capacity and a base rate can be reduced.

Figure 1:
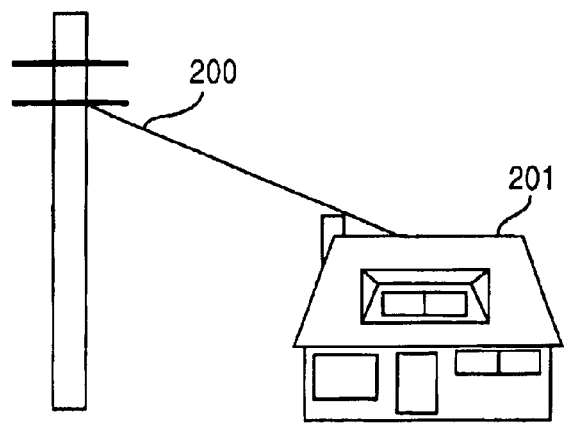
FIG. 1 is a schematic view illustrating one example that power is supplied to a detached house.
Figure 2:
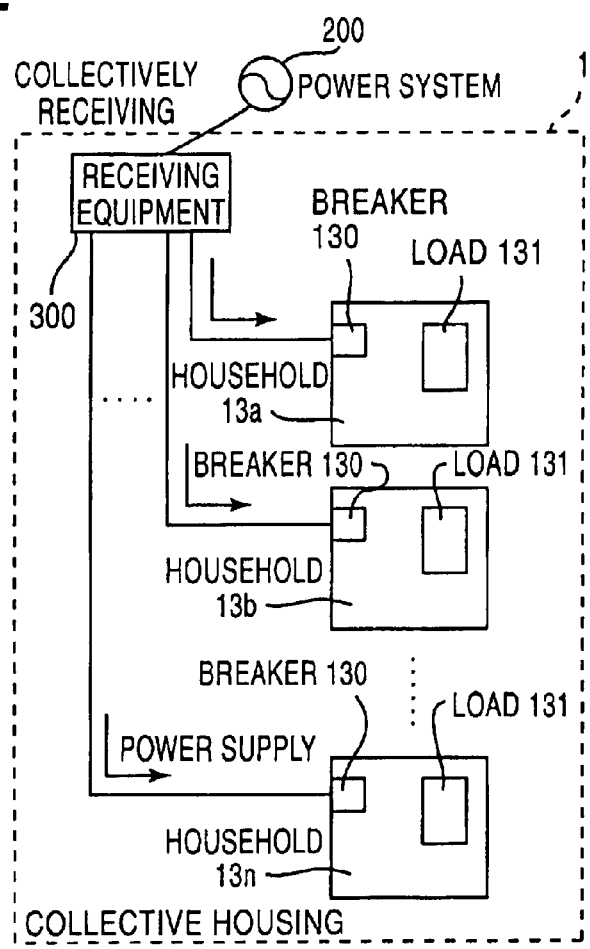
FIG. 2 is a schematic view illustrating one example of a system for collectively receiving at a high voltage and distributing at a low voltage which is used for distributing from a power distribution company to collective housing such as apartments or to a group of detached houses.
Figure 3:
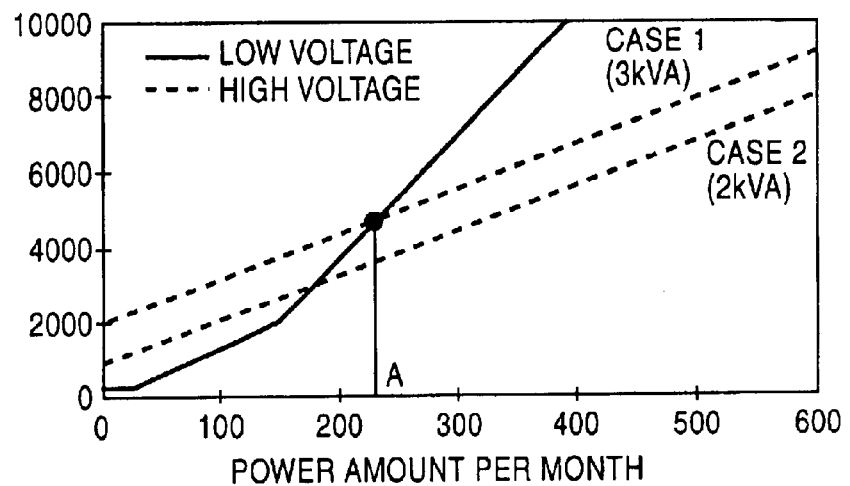
FIG. 3 is a diagram for comparing power amounts used in a month and electricity bills in collective high voltage receiving and low voltage receiving.

The foregoing and other objects, features, aspects and advantages of the present invention will become more apparent from the following detailed description of the present invention when reviewed in conjunction with the accompanying drawings.

DESCRIPTION OF THE PREFERRED EMBODIMENT(S)

Explanations are made on various embodiments of the invention by referring to the drawings. As described above, the high voltage collective receiving and low voltage distributing system can reduce a contract capacity of the collective housing by effectively distributing power capacity for each household (each user) and can reduce a base rate.

The system of the present invention prevents tripping of a breaker even with a small contract capacity by controlling high load electrical appliances among electrical appliances to be used.

Figure 4:
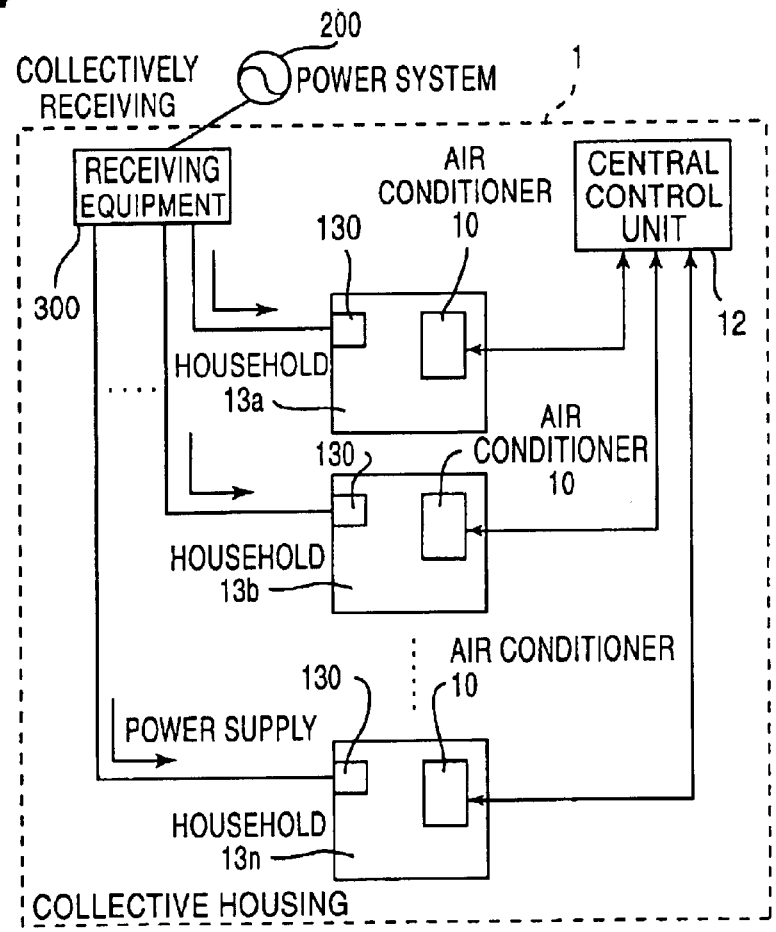
FIG. 4 is a block diagram illustrating an embodiment of a system according to the present invention.

FIG. 4 is a block diagram illustrating a composition of collective housing using the system of this invention. In the present invention, the collective housing refers to an apartment, dormitory, or a group of detached houses.

As shown in FIG. 4, high voltage power is collectively supplied to the collective housing 1 from a power system 200. The power is supplied to receiving equipment 300 provided in the collective housing 1 from the power system 200. The receiving equipment 300 distributes power to households. Power is supplied to each of the households 13a–13n through a breaker 130. Each of the households is equipped with a high load electrical appliance 10 to be controlled by the present invention. In this embodiment, an air conditioner as the high load electrical appliance is controlled. The air conditioner 10 is connected with a central controlling unit 12 via LAN or the like and operation of the air conditioner is controlled on the basis of direction signals fed from the central control unit 12 as described later.

Figures 5, 6, 7:
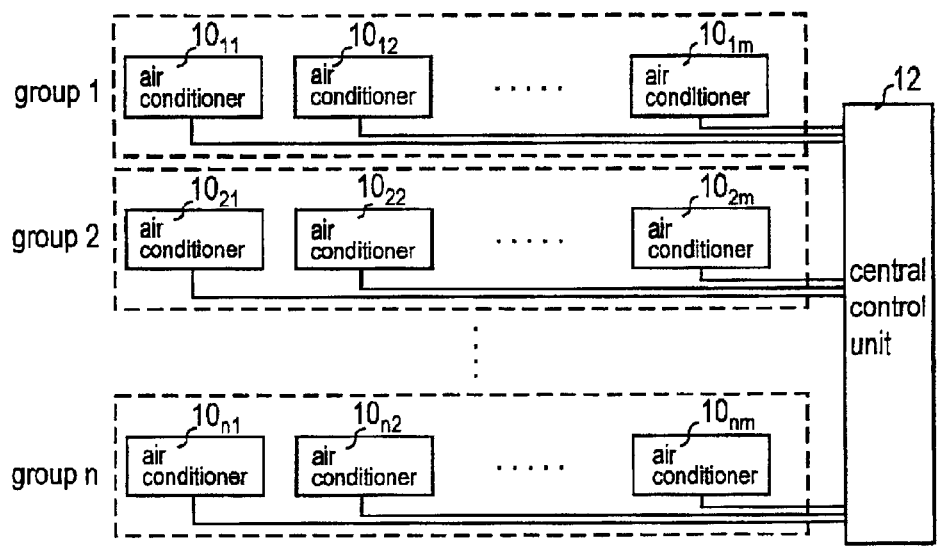
FIG. 5 is a block diagram illustrating the embodiment of the present invention specifically.
FIG. 6 is a diagram illustrating a control method of the present invention.
FIG. 7 is a diagram illustrating another control method of the present invention.

FIG. 5 is a block diagram illustrating an essential part of one of the embodiments of this invention. As shown in FIG. 5, users are divided in a plurality of groups. In this embodiment, the users are divided into the group 1 to n. In a case of the collective housing such as apartments, the users can be divided by floors, for example. Each group constitutes of m households with air conditioners $10_{11}$ to $10_{1m}$ (air conditioners $10_{n1}$ to $10_{nm}$).

When the air conditioners 10 . . . are being operated at the same time in such collective housing, a large amount of power is consumed at one time. Particularly a large starting current is required for starting the air conditioners 10. If no measure is taken, power equipment for providing power enough to start all the air conditioners at one time is required, resulting in a large sized receiving equipment, a power contract for a large capacity, and a high contract fee.

In the present invention, the air conditioners 10 . . . are connected with the central control unit 12 via LAN or the like so that the receiving capacity can be reduced without loss of comfort of dwellers. The central control unit 12 controls operation of the air conditioners $10_{11}$–$10_{1m}$ ($10_{n1}$–$10_{nm}$) by the group to prevent concentration of power consumption.

The operation statuses of the groups 1 to n are changed in time or alternately. Explanation of specific control is followed.

FIG. 6 shows control of start of the air conditioners $10_{11}$–$10_{1m}$($10_{n1}$–$10_{nm}$) by the group. Explanation is made regarding a case of three groups for simplification. A large current flows through the air conditioners 10 . . . in starting operation. In the example of FIG. 6, the central control unit 12 controls starting operation of the air conditioners 10 . . . in each of the groups so that the air conditioners 10 in one of the three groups do not start.

In FIG. 6, "○" indicates that the air conditioners in the group can start operation and "x" indicates that the air conditioners in that group cannot start operating.

As shown in FIG. 6, the central control unit 12 controls so that one of the three groups cannot start operation and a group of air conditioners $10_{11}$–$10_{1m}$($10_{n1}$–$10_{nm}$) which cannot start operation is changed by time. In the embodiment shown in FIG. 6, a group of air conditioners which cannot start operation is changed by two minutes. For the first two minutes, the air conditioners in the group 2 cannot start operation. For the next two minutes, the air conditioners in the group 3 cannot start operation, and then the air conditioners in the group 1 cannot start operation. A peak current flow for starting operation can be reduced to two-thirds by changing a group of air conditioners which cannot start operation.

The central control unit controls to prohibit only starting operation of the air conditioners 10, and thus the air conditioner which once starts operation can continue to operate even when the group of the air conditioner is in a starting operation prohibited period. This is because the air conditioners 10 . . . need a large current only at starting operation, and a peak current flow can be greatly reduced by controlling only starting operation.

As described, even when a receiving capacity is reduced to two-thirds, breaker trip caused by current concentration is prevented by controlling starting operation of the air conditioners 10 . . .

In the above example, the air conditioners cannot operate in one of three periods in one operation cycle, however it is only for two minutes and the user cannot feel its effect substantially.

Explanation is now made regarding a control method to suppress total power consumption without making users feel uncomfortable by referring to FIG. 7. In FIG. 7, the users are divided into four groups to simplify the explanation. In the method shown in FIG. 7, the central control unit 12 controls the air conditioners in each of the groups to output 100%, 50%, and 25%. The central control unit 12 controls the groups of the air conditioners to output 100% in "○", 50% in "Δ", and 25% in "x". During each period, the air conditioners can operate to output not more than direction from the central control unit 12 at maximum irrespective of the power directed by users. Needless to say, the air conditioners can operate to output less than the direction from the central control unit 12.

In FIG. 7, the central control unit 12 controls the air conditioners in the group 1 to output 100%, in the groups 2 and 4 to output 50%, and in the group 3 to output 25% for the first two minutes. Then for the next two minutes, the central control unit 12 controls the air conditioners in the group 4 to output 100%, in the groups 1 and 3 to output 50%, and in the group 2 to output 25%. By changing the percentage of output of the air conditioners in an orderly manner, total power consumption can be suppressed without making the users feel uncomfortable.

In the example of FIG. 7, power consumption is continuously suppressed to 56% as expressed by (100 +50+25 50) 400 =0.56.

It is possible to provide both the control shown in FIG. 6 and the control shown in FIG. 7 simultaneously.

In the above embodiment, an air conditioner is taken as an example of a high load electrical appliance, and any other electrical appliances can be also controlled to reduce receiving power. For example, in case that induction ranges are equipped as a cooker in an apartment or the like, the induction ranges can be controlled as shown in FIG. 7. In this case, an operation cycle should be shortened.

In the above embodiments, the operation is controlled by the group and can be also controlled by the user.

In controlling as shown in FIG. 7, for example, one of the groups is removed from the operation cycle and is controlled to output 100% continuously and output from the other groups are controlled so as to reduce power consumption. In this case, the users in the other group may feel shortchanged. Thus, the users in the group removed from the operation cycle pay a greater electricity bill than the users in the other groups to make up the difference. It is also possible to provide an auction to make each user select desirable conditions.

In the above embodiments, the present invention is applied to collective housing, but it can be applied to a detached house where each of a plurality of rooms is equipped with a high load electrical appliance such as an air conditioner. In this case also, breaker trip caused by electric current concentration in using the plurality of the high load electrical appliances can be prevented.

As described above, this invention can suppress power consumption, and breaker trippage caused by electric current concentration can be suppressed. In the case of collective housing, the total contract capacity can be reduced, resulting in a reduction of a base rate.

Although the present invention has been described and illustrated in detail, it should be clearly understood that the description discloses examples of different embodiments of the invention and is not intended to be limited to the examples or illustrations provided. Any changes or modifications within the spirit and scope of the present invention are intended to be included, the invention being limited only by the terms of the appended claims.

What is claimed is:

1. The power load control system for a plurality of high load electrical appliances, comprising:

a power control unit connected with the plurality of high load electrical appliances, wherein the power control unit controls the plurality of high load electrical appliances together, and wherein the power control unit controls each of the plurality of high load electrical appliances to start to operate in time or alternately with each other according to the start-up current of each of the plurality of high load electrical appliances.

2. The power load control system according to claim 1, wherein the plurality high load electrical appliances are divided into groups, and the power control unit controls the electrical appliances in one to n−1 of the n groups to output 100% and the electrical appliances in the rest of the groups to output a non-zero amount less than 100%, and changes an output percentage cycle periodically.

3. The power load control system according to claim 1, wherein the plurality of high load electrical appliances are linked with the power control unit via a wired or wireless communication line.

4. A power load control system for a plurality of high load electrical appliances, comprising:

a power control unit connected with the plurality of high load electrical appliances, wherein the power control unit controls operation of the plurality of high load electrical appliances together, wherein the plurality of high load electrical appliances are divided in n groups, and the power control units controls to prohibit the high load electrical appliances in one to n−1 of the n groups from starting operation for a certain time and allow the high load electrical appliances in the rest of the groups to start and continue operation according to the start-up current of each of the plurality of high load electrical appliances, and repeats to control periodically so as to ensure that the one to n−1 of the n groups are prohibited from starting operation.

5. The power load control system according to claim 4, wherein the plurality of high load electrical appliances are linked with the power control unit via a wired or wireless communication line.

6. A power load control system, comprising:

a system for collectively receiving a high voltage by receiving equipment equipped in collective housing and distributing a low voltage from the receiving equipment to each of households in the collective housing, high load electrical appliances equipped in the households, and a power control unit connected with each of the high load electrical appliances, wherein the power control unit controls operation of the high load electrical appliances together, and wherein the power control unit controls each of the high load electrical appliances to start to operate in time or alternately with each other according to the start-up current of each of the plurality of high load electrical appliances.

7. The power load control system according to claim 6, wherein the collective housing refers to an apartment, a dormitory, or a group of a plurality of detached houses.

8. The power load control system according to claim 6, wherein the households in the collective housing are divided into n groups, the power control unit controls to prohibit the high load electrical appliances in one to n−1 of the n groups from starting operation for a certain time and allow the high load electrical appliances in the rest of the groups to start and continue operation, and repeats to control periodically so as to ensure that the one to n−1 of the n groups are prohibited from starting operation.

9. The power load control system according to claim 6, wherein the households in the collective housing are divided into n groups, the power control unit controls the high load electrical appliances in one to n−1 of the n groups to output 100% and the electrical appliances in the rest of the groups to output less than 100%, and changes an output percentage cycle periodically.

10. The power load control system according to claim 6, wherein the high load electrical appliances are linked with the power control unit via a wired or wireless communication line.

* * * * *